United States Patent
Guen

(10) Patent No.: US 10,862,097 B2
(45) Date of Patent: Dec. 8, 2020

(54) SECONDARY BATTERY

(71) Applicant: Samsung SDI Co., Ltd., Yongin-si (KR)

(72) Inventor: Minhyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 777 days.

(21) Appl. No.: 14/986,494

(22) Filed: Dec. 31, 2015

(65) Prior Publication Data

US 2017/0047576 A1 Feb. 16, 2017

(30) Foreign Application Priority Data

Aug. 10, 2015 (KR) .................. 10-2015-0112592

(51) Int. Cl.
| | | |
|---|---|---|
| *H01M 2/34* | (2006.01) | |
| *H01M 10/052* | (2010.01) | |
| *H01M 2/04* | (2006.01) | |
| *H01M 2/12* | (2006.01) | |

(52) U.S. Cl.
CPC ............. *H01M 2/34* (2013.01); *H01M 2/043* (2013.01); *H01M 2/0404* (2013.01); *H01M 2/1264* (2013.01); *H01M 10/052* (2013.01); *H01M 2/1235* (2013.01); *H01M 2/1241* (2013.01); *H01M 2/1294* (2013.01); *H01M 2200/20* (2013.01); *H01M 2220/20* (2013.01); *H01M 2220/30* (2013.01)

(58) Field of Classification Search
CPC ...... H01M 2/34; H01M 2/043; H01M 2/0404; H01M 2/1264; H01M 10/052; H01M 2200/20; H01M 2200/30; H01M 2/1241; H01M 2/1235; H01M 2/1294
See application file for complete search history.

(56) References Cited

U.S. PATENT DOCUMENTS

| 3,669,302 A * | 6/1972 | Markarian ............... H01G 9/12 |
| | | 220/203.08 |
| 2005/0277017 A1* | 12/2005 | Cho ..................... H01M 2/023 |
| | | 429/56 |
| 2010/0247987 A1* | 9/2010 | Holung ............... H01M 10/052 |
| | | 429/62 |
| 2010/0323234 A1* | 12/2010 | Kim ..................... H01M 2/206 |
| | | 429/158 |

(Continued)

FOREIGN PATENT DOCUMENTS

| JP | 2000-90960 A | 3/2000 |
| KR | 1999-0031352 A | 5/1999 |

(Continued)

*Primary Examiner* — Ula C Ruddock
*Assistant Examiner* — Matthew W Van Oudenaren
(74) *Attorney, Agent, or Firm* — Lewis Roca Rothgerber Christie LLP

(57) ABSTRACT

A secondary battery includes: an electrode assembly including a first electrode plate, a second electrode plate, and a separator; an electrode tab electrically connected to the electrode assembly; a current collector plate electrically connected to the electrode tab; a case accommodating the electrode assembly, the electrode tab, the current collector plate, and an electrolyte therein; a cap plate sealing the case and including a safety vent at one region; and a current interruption device connected to the safety vent and the electrode tab.

10 Claims, 6 Drawing Sheets

(56) References Cited

U.S. PATENT DOCUMENTS

| | | | | |
|---|---|---|---|---|
| 2011/0039136 A1* | 2/2011 | Byun | ................. | H01M 2/0404 |
| | | | | 429/56 |
| 2013/0216871 A1* | 8/2013 | Lee | .................... | H01M 2/0413 |
| | | | | 429/62 |
| 2013/0266830 A1* | 10/2013 | Byun | ...................... | H01M 2/34 |
| | | | | 429/61 |
| 2015/0243960 A1 | 8/2015 | Imanishi et al. | | |

FOREIGN PATENT DOCUMENTS

| KR | 10-2010-0137904 A | 12/2010 |
|---|---|---|
| KR | 10-2015-0033667 A | 4/2015 |

* cited by examiner

SECONDARY BATTERY

CROSS-REFERENCE TO RELATED APPLICATION

This application claims priority to, and the benefit of, Korean Patent Application No. 10-2015-0112592 filed on Aug. 10, 2015 in the Korean Intellectual Property Office, and all the benefits accruing therefrom under 35 U.S.C. 119, the content of which are herein incorporated by reference in its entirety.

BACKGROUND

1. Field

Embodiments of the present invention relate to a secondary battery.

2. Description of the Related Art

In general, unlike primary batteries, which are not rechargeable, secondary batteries can be charged and discharged. Low-capacity secondary batteries each using a single battery cell packaged in a battery pack are widely employed in small-sized portable electronic devices such as cellular phones or camcorders, while large-capacity secondary batteries each using tens of battery cells connected to each other in a battery pack are typically used for driving motors of hybrid automobiles and the like.

Secondary batteries may be manufactured in various suitable shapes, including cylindrical and prismatic shapes. The secondary battery is generally configured by accommodating an electrode assembly having a positive plate, a negative plate, and a separator as an insulator located therebetween in a case with an electrolyte, and installing a cap plate having electrode terminals in the case. Positive and negative electrode terminals are connected to the electrode assembly, and are exposed to the outside through the cap plate (i.e., protrude through the cap plate to the outside).

When the secondary battery is damaged due to overcharge or penetration, the internal pressure of the secondary battery may increase (e.g., due to an extreme temperature rise), and the secondary battery may explode. Therefore, a secondary battery configured to have enhanced safety is beneficial.

SUMMARY

Embodiments of the present invention provide a secondary battery which includes a current interruption device for interrupting the flow of current when a vent is ruptured by an increase in the internal pressure of a battery cell (e.g., due to damage caused by overcharge or penetration).

The above and other embodiments of the present invention will be described in or be apparent from the following description of exemplary embodiments.

According to an embodiment of the present invention, there is provided a secondary battery including: an electrode assembly including a first electrode plate, a second electrode plate, and a separator; an electrode tab electrically connected to the electrode assembly; a current collector plate electrically connected to the electrode tab; a case accommodating the electrode assembly, the electrode tab, the current collector plate and an electrolyte therein; a cap plate sealing the case and including a safety vent provided at one region; and a current interruption device connected to the safety vent and the electrode tab.

The electrode tab may include a first electrode tab electrically connected to the first electrode plate and a second electrode tab electrically connected to the second electrode plate. The current interruption device may include a cutting part on a periphery of one of the first electrode tab and the second electrode tab, a vent pad coupled to a lower side of the safety vent, and a connecting part connecting the vent pad to the cutting part.

The cutting part may be electrically connected to one of the first electrode tab and the second electrode tab.

The cap plate may be electrically connected to the first electrode tab.

When the cutting part is connected to the second electrode tab, the connecting part may be an insulator.

The cutting part may be connected to one of the first electrode tab and the second electrode tab in a direction perpendicular to a lengthwise direction of the one of the first electrode tab and the second electrode tab.

The cutting part may have a blade formed toward the electrode tab.

The vent pad may be released to the outside of the case when an internal pressure of the case reaches a rupture pressure and the safety vent is opened.

A coupling force of the safety vent and the vent pad may be smaller than a force applied to the vent pad by a rupture pressure that is sufficient to open the safety vent.

The cutting part may be shaped as a rectangular ring.

As described above, the secondary battery according to embodiments of the present invention includes a current interruption device for interrupting the flow of current when a vent is ruptured by an increase in the internal pressure of a battery cell (e.g., due to damage caused by overcharge or penetration).

In addition, the secondary battery according to embodiments of the present invention includes a current interruption device including a vent pad, a connecting part, and a cutting part, and can interrupt the flow of current when a vent is ruptured by an increase in the internal pressure of a battery cell (e.g., due to damage caused by overcharge or penetration).

Further, it is possible to obviate a need for a typical separate fuse that prevent or substantially prevent the secondary battery from exploding due to an abnormal operation, such as overcharge or a typical overcharge safety device (OSD).

BRIEF DESCRIPTION OF THE DRAWINGS

The above and other features of embodiments of the present invention will become more apparent by describing, in detail, exemplary embodiments thereof with reference to the attached drawings in which.

DETAILED DESCRIPTION

Figure 1:
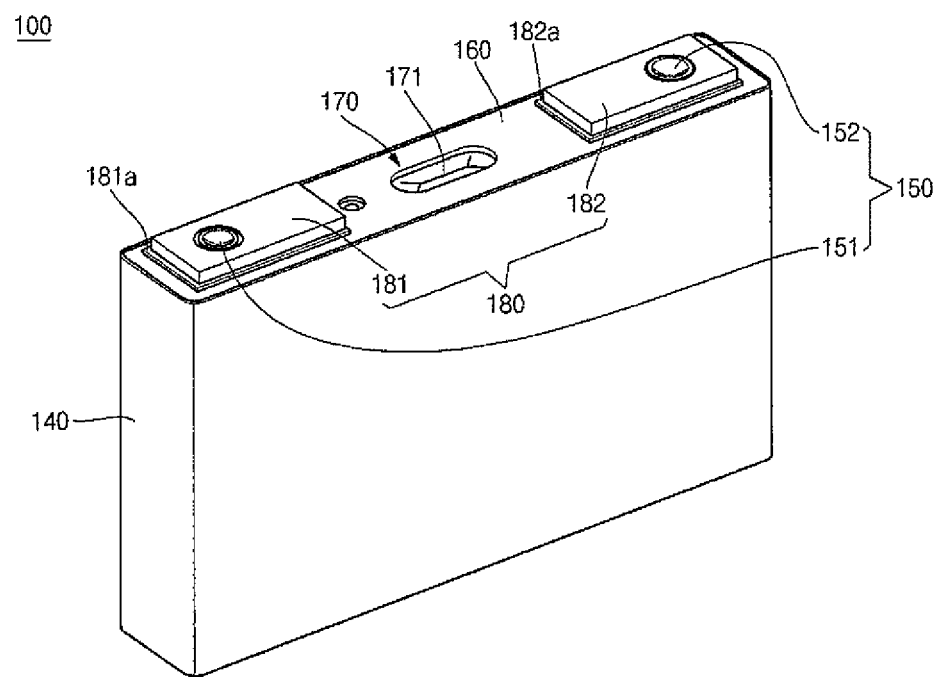
FIG. 1 is a perspective view of a secondary battery according to an embodiment of the present invention.

Hereinafter, examples of embodiments of the invention will be described in detail with reference to the accompanying drawings such that they can easily be made and used by those skilled in the art. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims and their equivalents.

In the drawings, the thickness of layers and regions are exaggerated for clarity. Like numbers refer to like elements (or components) throughout. As used herein, the term "and/or" includes any and all combinations of one or more of the associated listed items.

In addition, it will be understood that when an element or layer is referred to as being "on," "connected to," "coupled to," "connected with," "coupled with," or "adjacent to" another element or layer, it can be "directly on," "directly connected to," "directly coupled to," "directly connected with," "directly coupled with," or "directly adjacent to" the other element or layer, or one or more intervening elements or layers may be present. Further "connection," "connected," etc. may also refer to "electrical connection," "electrically connect," etc. depending on the context in which they are used as those skilled in the art would appreciate. When an element or layer is referred to as being "directly on," "directly connected to," "directly coupled to," "directly connected with," "directly coupled with," or "immediately adjacent to" another element or layer, there are no intervening elements or layers present.

In addition, the terminology used herein is for the purpose of illustrating particular embodiments only and is not intended to be limiting thereof. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first", "second", "third", etc. may be used herein to describe various members, elements, components, regions, layers and/or sections, these members, elements, components, regions, layers and/or sections should not be limited by these terms. These terms are only used to distinguish one member, element, component, region, layer, and/or section from another. Thus, for example, a first member, a first element, a first component, a first region, a first layer and/or a first section discussed below could be termed a second member, a second element, a second component, a second region, a second layer and/or a second section without departing from the spirit and scope of the present invention.

Further, it will also be understood that when one element, component, region, layer and/or section is referred to as being "between" two elements, components, regions, layers, and/or sections, it can be the only element, component, region, layer and/or section between the two elements, components, regions, layers, and/or sections, or one or more intervening elements, components, regions, layers, and/or sections may also be present.

Further, the use of "may" when describing embodiments of the present invention refers to "one or more embodiments of the present invention." Also, the term "exemplary" is intended to refer to an example or illustration.

As used herein, the term "substantially," "about," and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

Spatially relative terms, such as "beneath", "below", "lower", "under", "above", "upper", and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the exemplary term "below" and "under" can encompass both an orientation of above and below. The device may be otherwise oriented (e.g., rotated 90 degrees or at other orientations) and the spatially relative descriptors used herein should be interpreted accordingly.

Figure 2:
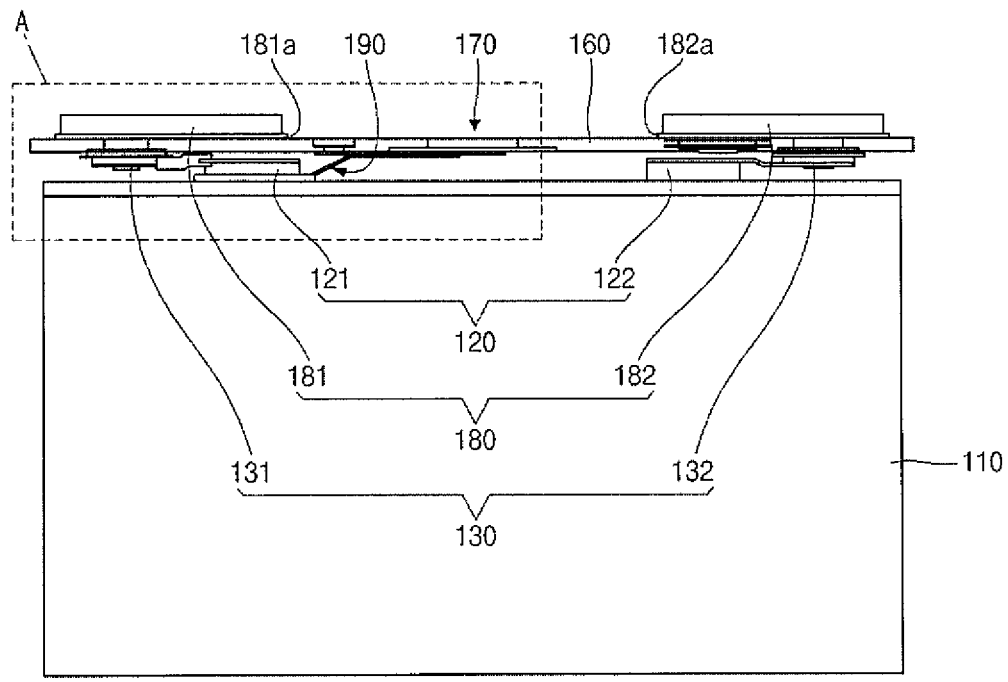
FIG. 2 is a front view illustrating an internal structure of a case of the secondary battery illustrated in FIG. 1.

FIG. 1 is a perspective view of a secondary battery 100 according to an embodiment of the present invention, and FIG. 2 is a front view illustrating an internal structure of a case of the secondary battery illustrated in FIG. 1.

Referring to FIGS. 1 and 2, the secondary battery 100 according to an embodiment of the present invention includes an electrode assembly 110, an electrode tab 120, a current collector plate 130, a case 140, a current collector terminal 150, a cap plate 160, a safety vent 170, a terminal plate 180, and a current interruption device 190.

The electrode assembly 110 includes a first electrode plate and a second electrode plate, which are shaped as a plate or as a layer, and a separator between the first electrode plate and the second electrode plate.

In addition, the electrode assembly 110 may be formed by winding or laminating a stacked structure of the first electrode plate, the second electrode plate, and the separator. Here, the first electrode plate may function as a positive electrode or a negative electrode. The second electrode plate may have a polarity opposite to that of the first electrode plate. The following description will be made on the assumption that the first electrode plate is a positive electrode, and that the second electrode plate is a negative electrode.

The first electrode plate is formed by coating a first electrode plate active material layer, which has a lithium-based oxide as a main component, on both surfaces of the first electrode plate made of a metal foil, such as aluminum. The second electrode plate is formed by coating a second electrode plate active material layer, which has a carbon material as a main component, on both surfaces of the second electrode plate made of a metal foil, such as copper. In addition, uncoated portions are formed on the first electrode plate and on the second electrode plate to become passages for the flow of current between the respective electrode plates and the outside.

In addition, the separator positioned between the first electrode plate and the second electrode plate may prevent or substantially prevent an electrical short, while also allowing ions to move. The separator may include polyethylene, polypropylene, or a composite film of polyethylene and polypropylene.

The present invention is not limited to the first electrode plate, the second electrode plate, and the separator materials listed herein.

The electrode tab 120 may include a first electrode tab 121 and a second electrode tab 122. The first electrode tab 121 may be formed by stacking bar-shaped tabs extending from one side of the uncoated portion of the first electrode plate, or by electrically connecting a separate tab to one side of the first electrode plate. The first electrode tab 121 is made of a metal, such as aluminum.

The second electrode tab 122 may also be formed by stacking bar-shaped tabs extending from one side of the uncoated portion of the second electrode plate, or by electrically connecting a separate tab to one side of the second electrode plate. The second electrode tab 122 is made of a metal, such as copper.

The present invention is not limited to the first electrode tab 121 and the second electrode tab 122 listed herein.

The current collector plate 130 may include a first current collector plate 131 and a second current collector plate 132. One end of the first current collector plate 131 is electrically connected to the first electrode tab 121, and extends along the cap plate 160, and the other end of the first current collector plate 131 is electrically connected to a first current collector terminal 151 of a current collector terminal 150. The first current collector plate 131 is made of a metal, such as aluminum or an aluminum alloy. One end of the second current collector plate 132 is electrically connected to the second electrode tab 122, and extends along the cap plate 160, and the other end of the second current collector plate 132 is electrically connected to a second current collector terminal 152 of the current collector terminal 150. The second current collector plate 132 is made of a metal, such as copper or a copper alloy.

The present invention is not limited to the materials of the first current collector plate 131 and the second current collector plate 132 listed herein.

The case 140 has a receiving space inside an opening, and the electrode assembly 110 and an electrolyte are accommodated in the receiving space. The case 140 is made of a metal, such as aluminum or an aluminum alloy. In addition, the electrolyte may include a lithium salt dissolved in an organic solvent. The electrolyte may be a liquid, solid, or gel. The present invention is not limited to the case 140 materials listed herein.

The current collector terminal 150 includes the first current collector terminal 151 and the second current collector terminal 152, and passes through the cap plate 160 to the outside (e.g., an exterior of the case 140). The first current collector terminal 151 and the second current collector terminal 152 are electrically connected to the first current collector plate 131 and to the second current collector plate 132, respectively. The first current collector terminal 151 is made of a metal, such as aluminum or an aluminum alloy, and the second current collector terminal 152 is made of a metal, such as copper or a copper alloy. In addition, the first current collector terminal 151 is electrically connected to the cap plate 160, and the first current collector terminal 151 and the cap plate 160 may have the same polarity. The second current collector terminal 152 is insulated from the cap plate 160 by an insulation member.

The present invention is not limited to the first current collector terminal 151 and the second current collector terminal 152 materials listed herein.

The cap plate 160 is coupled to the case 140, and seals the opening of the case 140. The safety vent 170 is installed in the cap plate 160, and the current collector terminal 150 protrudes outside of the cap plate 160. In addition, the cap plate 160 and the case 140 may include the same or substantially the same material.

The safety vent 170 may be shaped as a rectangular ring having circular corners (i.e., rounded corners). The safety vent 170 may be installed in a vent hole in the cap plate 160, or may be integrally formed in the cap plate 160. The safety vent 170 may be positioned at the center of the cap plate 160. In addition, the safety vent 170 may have a smaller thickness than other regions of the cap plate 160, and a notch 171 of the safety vent 170 may be opened at a predefined rupture pressure.

The terminal plate 180 includes a first terminal plate 181 and a second terminal plate 182. A fastening plate 181a and an insulation plate 182a are installed on the cap plate 160, and the first terminal plate 181 and the second terminal plate 182 are installed on the fastening plate 181a and the insulation plate 182a, respectively. The first terminal plate 181 and the second terminal plate 182 are electrically connected to the first current collector terminal 151 and the second current collector terminal 152, respectively. The first terminal plate 181 is made of a metal, such as aluminum or an aluminum alloy, and the second terminal plate 182 is made of a metal, such as copper or a copper alloy. In addition, the first terminal plate 181 is electrically connected to the cap plate 160 through the fastening plate 181a, and the first terminal plate 181 and the cap plate 160 may have the same polarity. The second terminal plate 182 may be insulated from the cap plate 160 by the insulation plate 182a.

The present invention is not limited to the first terminal plate 181 and the second terminal plate 182 materials listed herein.

Figure 3:
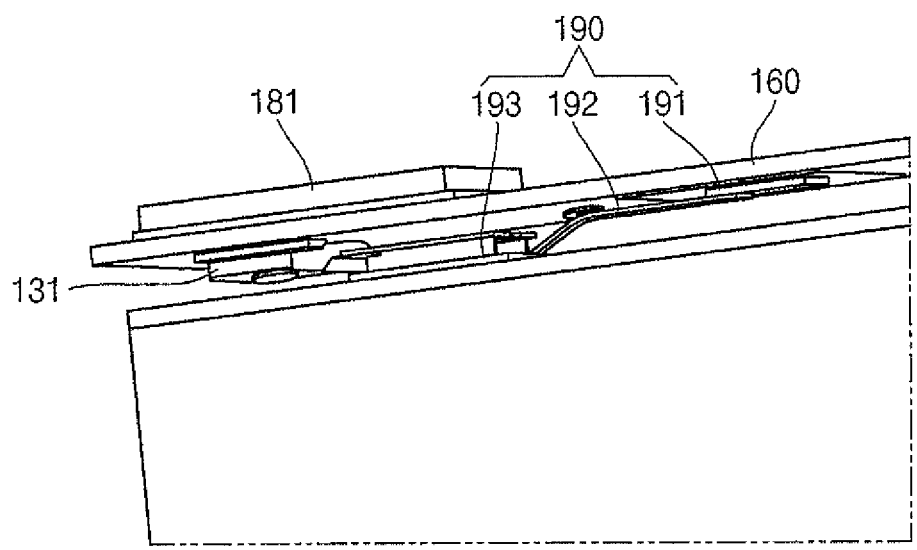
FIGS. 3 and 4 are enlarged views illustrating states in which a safety vent and a current interruption device are connected.
Figure 4:
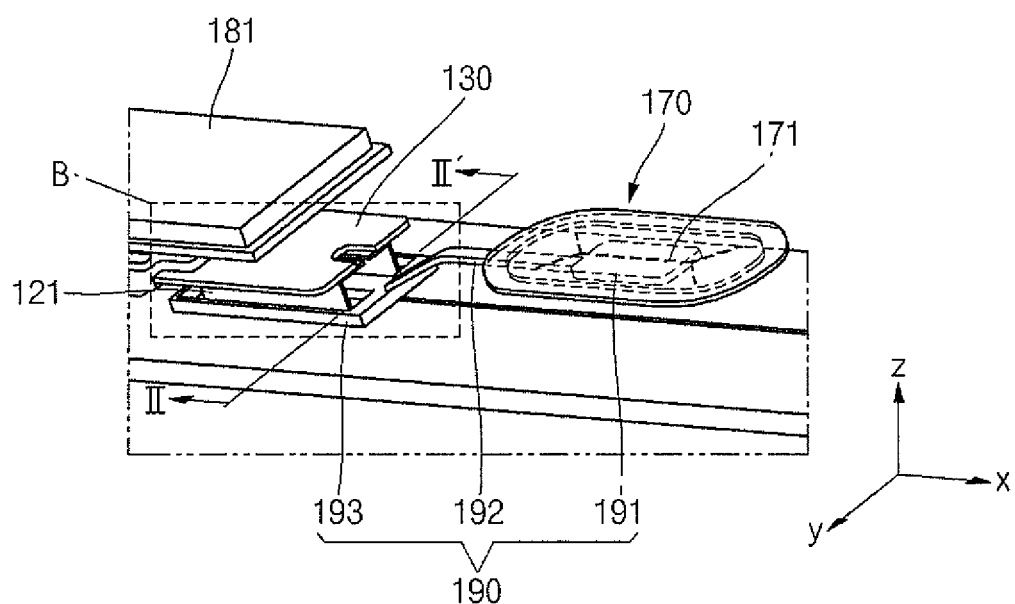

FIGS. 3 and 4 are enlarged views illustrating states in which a safety vent 170 and a current interruption device 190 are connected. The current interruption device 190 is connected between the safety vent 170 and the electrode assembly 110, and may include a vent pad 191, a connecting part 192, and a cutting part 193.

The vent pad 191 is coupled to a lower side of the safety vent 170. The vent pad 191 may have a smaller size than a portion of the safety vent 170 that is opened by a rupture. In addition, when the safety vent 170 is opened at the predefined rupture pressure, the vent pad 191 is released to the outside of the case 140. In order to make the vent pad 191 released to the outside, a coupling force of the safety vent 170 and the vent pad 191 may be smaller than a force applied to the vent pad 191 that is sufficient to open the safety vent 170 due to the rupture pressure.

The connecting part 192 connects the vent pad 191 to the cutting part 193, and transfers the force applied to the vent pad 191 due to the rupture pressure to the cutting part 193 when the vent pad 191 is ruptured at the rupture pressure. In addition, when the cap plate 160 is electrically connected to the first current collector terminal 151 and to the first terminal plate 181, and when the cutting part 193 is connected to the second electrode tab 121, the connecting part 192 may be an insulator. When the cutting part 193 is not electrically connected to the second electrode tab 121, the connecting part 192 may be either a conductor or an insulator.

The cutting part 193 may be formed on a periphery of the first electrode tab 121 or of the second electrode tab 122, and may be connected to the first electrode tab 121 or to the second electrode tab 122. To facilitate cutting of the electrode tab 120, the cutting part 193 may be positioned in a direction (x-axis) perpendicular to a lengthwise direction (z-axis) of the electrode tab 120.

Figure 5:
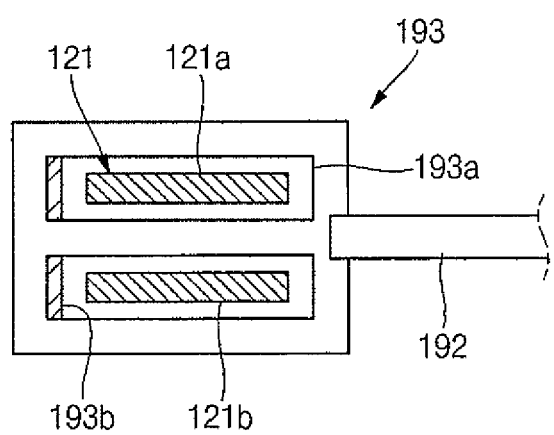
FIG. 5 is a cross-sectional view illustrating the portion B of FIG. 4 taken along the line II-II' of FIG. 4.
Figure 6:
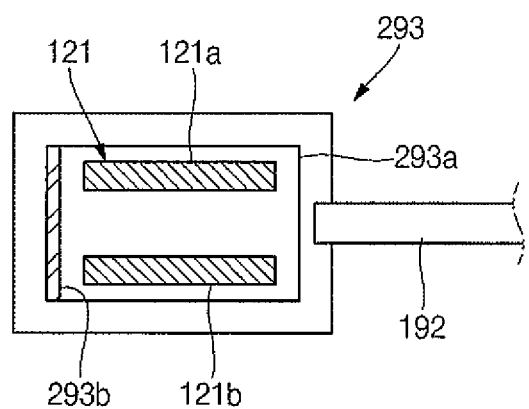
FIG. 6 is a cross-sectional view illustrating a connection relationship of an electrode tab and a current interruption device in a secondary battery according to another embodiment of the present invention.
Figure 7:
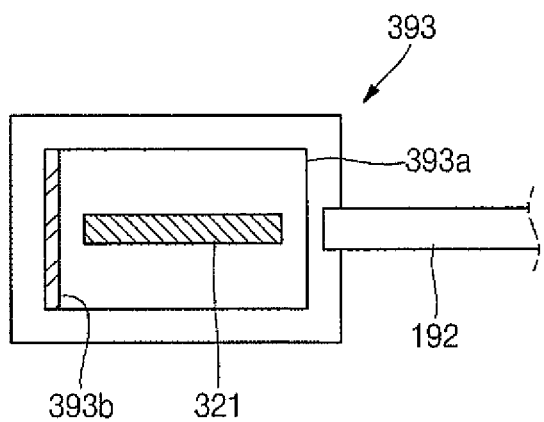
FIGS. 7 to 9 are cross-sectional views illustrating a connection relationship of an electrode tab and a current interruption device in a secondary battery according to other embodiments of the present invention.
Figure 8:
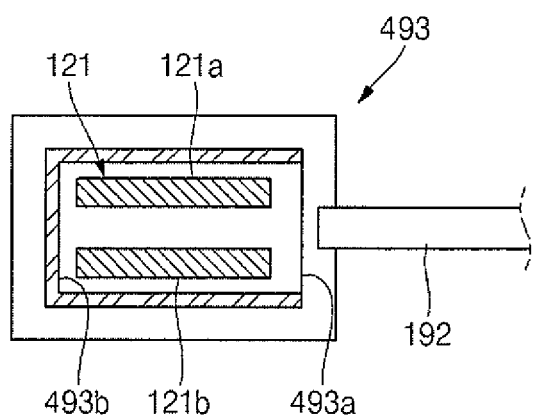
Figure 9:
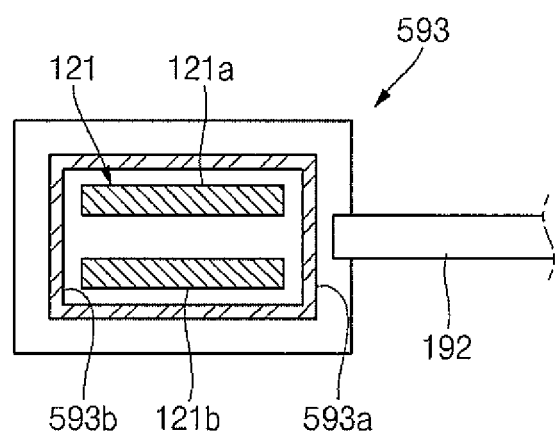

FIG. 5 is a cross-sectional view illustrating the portion B of FIG. 4 taken along the line II-II' of FIG. 4, FIG. 6 is an cross-sectional view illustrating a connection relationship of an electrode tab and a current interruption device in a secondary battery according to another embodiment of the present invention, and FIGS. 7 to 9 are cross-sectional views illustrating a connection relationship of an electrode tab and a current interruption device in a secondary battery according to other embodiments of the present invention. The cutting parts 193, 293, 393, 493, 593 include electrode tab holes 193a, 293a, 393a, 493a, 593a and blades 193b, 293b, 393b, 493b, 593b, respectively.

The first electrode tabs 121, 321 pass the electrode tab holes 193a, 293a, 393a, 493a, 593a, and the electrode tab holes 193a, 293a, 393a may have a shape varied according to the shape of the corresponding first electrode tabs 121, 321.

Referring to FIG. 5, as an example, when the first electrode tab 121 includes two electrode tabs 121a and 121b, two electrode tab holes 193a each shaped as a rectangular ring may each surround one of the two electrode tabs 121a and 121b.

Referring to FIG. 6, as another example, when the first electrode tab 121 includes two electrode tabs 121a and 121b, an electrode tab hole 293a shaped as a rectangular ring may surround both of the two electrode tabs 121a and 121b.

Referring to FIG. 7, as still another example, when the first electrode tab 121 includes an electrode tab 321, an electrode tab hole 393a shaped as a rectangular ring may surround the electrode tab 321.

The blades 193b, 293b, 393b, 493b, 593b may be positioned inside the electrode tab holes 193a, 293a, 393a, 493a, 593a, respectively.

Referring again to FIG. 6, as an example, the blade 293b may be formed on only one side of the rectangular ring shaped electrode tab hole 293a.

Referring to FIG. 8, as another example, the blade 493b may be formed on three sides of the rectangular ring shaped electrode tab hole 493a.

Referring to FIG. 9, as still another example, the blade 593b may be formed on all of four sides of the rectangular ring shaped electrode tab hole 593a.

Figure 10:
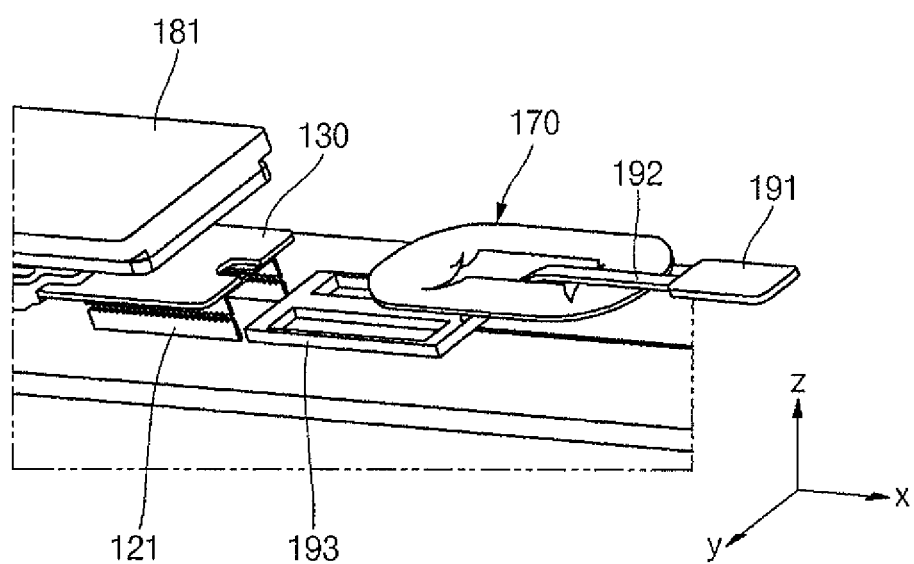
FIG. 10 is a view illustrating a vent pad released by a rupture pressure in a secondary battery according to an embodiment of the present invention.

FIG. 10 is a view illustrating a vent pad 191 released by a rupture pressure in a secondary battery according to an embodiment of the present invention. Here, a force applied to the vent pad 191 when the vent pad 191 is released by the rupture pressure is transferred to the cutting part 193 through the connecting part 192, and the transferred force cuts the first electrode tab 121 or the second electrode tab 122 having the cutting part 193 positioned thereon, thereby interrupting the flow of current.

Therefore, the current interruption device 190 interrupts the current when a vent is ruptured by an increase in the internal pressure of a battery cell due to damage caused by overcharge or penetration, thereby preventing the secondary battery 100 from exploding. Further, it is possible to obviate a need for a typical separate fuse that prevent or reduce the secondary battery from exploding due to an abnormal operation, such as overcharge or a typical overcharge safety device (OSD).

While the secondary battery of embodiments of the present invention has been shown and described with reference to exemplary embodiments thereof, it will be understood by those of ordinary skill in the art that various suitable changes in form and details may be made therein without departing from the spirit and scope of the present invention as defined by the following claims and their equivalents.

What is claimed is:

1. A secondary battery comprising:
an electrode assembly comprising a first electrode plate, a second electrode plate, and a separator;
an electrode tab electrically connected to the electrode assembly;
a current collector plate electrically connected to the electrode tab;
a case accommodating the electrode assembly, the electrode tab, the current collector plate, and an electrolyte therein;
a cap plate sealing the case and comprising a safety vent, the safety vent being configured to rupture at a rupture pressure; and
a current interruption device physically connected to the safety vent by an electrically insulating connecting part and extending at least partially around an outer periphery of the electrode tab, the current interruption device being configured to physically separate the electrode tab from the current collector plate when the safety vent ruptures to electrically separate the electrode assembly and the current collector plate.

2. A secondary battery comprising:
an electrode assembly comprising a first electrode plate, a second electrode plate, and a separator;
an electrode tab electrically connected to the electrode assembly; the electrode tab comprising:
a first electrode tab electrically connected to the first electrode plate; and
a second electrode tab electrically connected to the second electrode plate;
a current collector plate electrically connected to one of the first and second electrode tabs;
a case accommodating the electrode assembly, the first and second electrode tabs, the current collector plate, and an electrolyte therein;
a cap plate sealing the case and comprising a safety vent, the safety vent being configured to rupture at a rupture pressure; and
a current interruption device connected to the safety vent and to said one of the first and second electrode tabs, the current interruption device being configured to physically separate the said one of the first and second electrode tabs from the current collector plate when the safety vent ruptures, the current interruption device comprising:
a cutting part on a periphery of the said one of the first electrode tab and the second electrode tab, the cutting part being configured to physically cut the said one of the first electrode tab and the second electrode tab when the safety vent ruptures;
a vent pad coupled to a lower side of the safety vent; and
a connecting part connecting the vent pad to the cutting part.

3. The secondary battery of claim 2, wherein the cutting part is electrically connected to the first electrode tab.

4. The secondary battery of claim 3, wherein the cap plate is electrically connected to the first electrode tab.

5. The secondary battery of claim 2, wherein the cutting part is connected to the second electrode tab, and
wherein the connecting part is an insulator.

6. The secondary battery of claim 2, wherein the cutting part is connected to the said one of the first electrode tab or the second electrode tab in a direction perpendicular to a lengthwise direction of the said one of the first electrode tab and the second electrode tab.

7. A secondary battery comprising:
an electrode assembly comprising a first electrode plate, a second electrode plate, and a separator;
an electrode tab electrically connected to the electrode assembly, the electrode tab comprising:
a first electrode tab electrically connected to the first electrode plate; and
a second electrode tab electrically connected to the second electrode plate;
a current collector plate electrically connected to the electrode tab;
a case accommodating the electrode assembly, the electrode tab, the current collector plate, and an electrolyte therein;
a cap plate sealing the case and comprising a safety vent; and
a current interruption device connected to the safety vent and to the electrode tab, the current interruption device comprising:
a cutting part on a periphery of one of the first electrode tab and the second electrode tab, the cutting part having a blade formed toward the electrode tab;
a vent pad coupled to a lower side of the safety vent; and
a connecting part connecting the vent pad to the cutting part.

8. The secondary battery of claim 2, wherein the vent pad is configured to be released to the outside of the case when an internal pressure of the case reaches a rupture pressure and the safety vent is opened.

9. The secondary battery of claim 2, wherein a coupling force of the safety vent and the vent pad is smaller than a force applied to the vent pad by a rupture pressure that is sufficient to open the safety vent.

10. The secondary battery of claim 2, wherein the cutting part is shaped as a rectangular ring.

* * * * *